3,170,938
SURFACE ACTIVE AGENTS
William W. Levis, Jr., Wyandotte, Mich., assignor to Wyandotte Chemicals Corporation, Wyandotte, Mich., a corporation of Michigan
No Drawing. Filed May 31, 1957, Ser. No. 662,557
6 Claims. (Cl. 260—404.5)

This application is a continuation-in-part of U.S. patent application, Serial No. 466,954, filed November 4, 1954, for "Surface Active Agents", now abandoned.

The present invention relates to certain novel surface active agents which are the quaternary ammonium salts of higher aliphatic acid and rosin acid esters of certain totally hydroxyalkylated alkylene polyamines.

The compounds of the present invention are derivatives of certain totally hydroxyalkylated alkylene polyamines. The first class of totally hydroxyalkylated alkylene polyamines used as intermediates in preparing the compounds of the present invention are the totally hydroxypropylated and the totally hydroxybutylated alkylene diamines conforming to the formula:

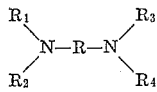

wherein R is an alkylene group containing 2 to 6 carbon atoms, and $R_1$, $R_2$, $R_3$ and $R_4$ are selected from the group consisting of the 2-hydroxypropyl group, the 2-hydroxybutyl group and the 1-methyl-2-hydroxypropyl group. Typical of the totally hydroxyalkylated alkylene diamines conforming to the above formula is N,N,N',N' tetrakis-(2-hydroxypropyl)ethylene diamine. The second class of totally hydroxyalkylated alkylene polyamines used as intermediates in preparing the compounds of the present invention are the totally hydroxypropylated and the totally hydroxybutylated 1,3-diamino-2-propanols conforming to the formula:

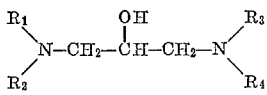

wherein $R_1$, $R_2$, $R_3$ and $R_4$ are selected from the group consisting of the 2-hydroxypropyl group, the 2-hydroxybutyl group and the 1-methyl-2-hydroxypropyl group. A typical example of the compounds conforming to the above formula is N,N,N',N' tetrakis(2-hydroxypropyl)1,3-diamino-2-propanol. The third class of totally hydroxyalkylated alkylene polyamines used as intermediates in preparing the compounds of the present invention are the totally hydroxypropylated and the totally hydroxybutylated polymers of ethylene diamine and propylene diamine conforming to the formula:

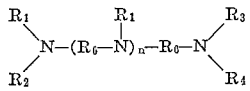

wherein $R_6$ is an alkylene radical selected from the group consisting of ethylene and propylene radicals, $n$ is an integer not higher than 2, and $R_1$, $R_2$, $R_3$ and $R_4$ are selected from the group consisting of the 2-hydroxypropyl group, the 2-hydroxybutyl group and the 1-methyl-2-hydroxypropyl group. A typical example of a compound conforming to the above formula is N,N,N',N'',N'' pentakis(2-hydroxypropyl)diethylene triamine. The totally hydroxyalkylated alkylene polyamines used in the synthesis of the compounds of the present invetnion are readily prepared by condensing propylene oxide, 1,2-butylene oxide or 2,3-butylene oxide or mixtures thereof with an appropriate alkylene polyamine in the presence of water at a temperature of 40–120° C. The quantity of oxide used in the condensation reaction is such as to furnish one mol of oxide for each amino hydrogen of the polyamine.

The higher fatty acid and rosin acid esters of the totally hydroxyalkylated alkylene polyamines of the present invention are prepared by esterifying the totally hydroxyalkylated alkylene polyamine of interest with a fatty acid or rosin acid containing at least 8 carbon atoms in its structure. Hereinafter, for convenience, the above compounds frequently will be referred to simply as "higher esters." Typical of the higher esters coming within the scope of the present invention is the monostearate ester of tetrakis(2-hydroxypropyl)ethylene diamine which has the following chemical structure:

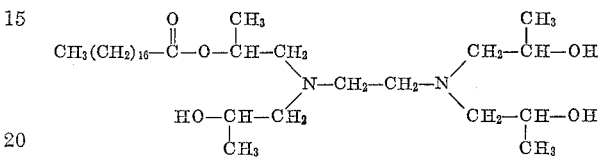

The higher esters may be prepared by conventional esterification techniques as for example by simply heating a higher fatty acid and a totally hydroxyalkylated alkylene polyamine.

Essentially any 8 or higher (about 20 being the practical upper limit only because of what is available in commercial quantities) carbon atom aliphatic acid or rosin acid may be used in preparing the compounds of this invention. Typical examples of such acids are 2-ethylhexanoic acid, octanoic acid, undecanoic acid, lauric acid, myristic acid, palmitic acid, abietic acid, etc. When an aliphatic acid is used in preparing the compounds of interest, it is preferred to employ acids having a low degree of unsaturation such as stearic and oleic acids except where the ester is to be used as an intermediate in the preparation of surface coating compositions. It is not necessary to use single acids in preparing the desired higher esters as products with desirable properties are obtained from mixtures of acids derived from natural sources such as olive oil, castor oil, cottonseed oil, tall oil, etc.

It will be apparent to those skilled in the art that when a higher fatty acid is esterfied with a totally hydroxyalkylated alkylene polyamine it is inveitable that a mixture of products is obtained. For eaxmple, when one mol of stearic acid is esterified with N,N,N',N' tetrakis(2-hyroxypropyl)ethylene diamine the predominant product will be the monostearate ester, but the reaction product will contain small amounts of both the distearate ester and unreacted N,N,N',N' tetrakis(2-hydroxypropyl) ethylene diamine and perhaps minor traces of the tri- and tetrastearate esters. For convenience in description in the subsequent discussion of the invention the esterification products will be referred to simply as the mono-, di-, tri- or tetraesters, since such designation identifies the principal constituent of the product. Although individual esters can be isolated by complicated procedures such as repeated molecular distillations, such purification is not required since the esterification products as produced have excellent surface active properties.

The higher esters of the totally hydroxyalkylated alkylene polyamines are lipophilic surface active agents having low HLB numbers as determined by the Method of W. C. Griffin, Journal of The Society of Cosmetic Chemists, 1, 419 (December 1948). The higher esters per se have utility as surface active agents in many non-aqueous systems and are also employed in conjunction with their oxyethylated derivatives to form multicomponent emulsifier systems. The simple acid salts of the higher esters, e.g. the hydrochloride and acetic acid salts, are water-soluble and are excellent emulsifiers. These latter emulsifying agents are extremely useful, since emulsions prepared therewith can be easily resolved by simply adding a small quantity of base to the emulsion. The higher esters, particularly the tetraesters, derived from aliphatic acids containing high degress of unsaturation, e.g. linoleic acid, function as drying oils and may be used in surface coating compositions. The mono- and diesters derived from the highly unsaturated aliphatic acids may be used as intermediates in preparing oil modified alkyd resins.

The quaternary ammonium salts of the higher esters are prepared by reacting an alkylating agent such as dimethylsulfate, methyl iodide, etc. with the higher ester to convert a tertiary amine group of the higher ester into a quaternary ammonium ion. Essentially any of the alkylating agents used in the art to quaternize tertiary amines may be used in preparing the quaternary ammonium salts of the higher esters. The resulting quaternary ammonium salts have excellent surface active properties and in addition are useful as antistatic agents for textiles.

The following examples are set forth to more clearly illustrate the principle and practice of the invention to those skilled in the art.

EXAMPLE 1

Part A

A total of 216 grams (1.5 mol) of 2-ethylhexanoic acid, 292 grams (1 mol) of N,N,N',N' tetrakis(2-hydroxypropyl)ethylene diamine and 250 grams of xylene are charged into a 3-neck flask equipped with a stirrer, thermometer, nitrogen bubbler and a reflux condenser to which is attached a decanting head for collecting and measuring the water formed in the esterification. The mixture is refluxed until 18 ml. of water is collected which indicates that the mono- 2-ethylhexanoate ester has been formed. The xylene and excess of 2-ethylhexanoic acid are then removed by vacuum distillation. The product is the mono-2-ethylhexanoate ester of N,N,N',N' tetrakis(2-hydroxypropyl)ethylene diamine.

Part B

The di- 2-ethylhexanoate ester of N,N,N',N' tetrakis-(2-hydroxypropyl)ethylene diamine is prepared as described in Part A above except that initially 2.5 mols of 2-ethylhexanoic acid is charged to the reaction and the esterification is continued until 36 ml. of water is collected which indicates the formation of the diester.

EXAMPLE 2

Part A

Stearic acid and N,N,N',N' tetrakis(2-hydroxypropyl) ethylene diamine are charged in an equal molar ratio to the apparatus described in Example 1, Part A that is modified in that the decanting head is replaced with an ordinary distillation takeoff head. The reaction mixture is heated for approximately 4 hours at reflux temperature and atmospheric pressure and then under vacuum at 160° C. until the reaction is complete. Heating is continued until titration of the reaction mixture indicates that all of the stearic acid has been esterified. The product is the monostearate ester of N,N,N',N' tetrakis (2-hydroxypropyl)ethylene diamine.

Part B

The distearate ester of N,N,N',N' tetrakis(2-hydroxypropyl)ethylene diamine is prepared as described in Part A above except that 2 mols of stearic acid are charged for each mol of the N,N,N',N' tetrakis(2-hydroxypropyl) ethylene diamine.

Part C

The monostearate esters of N,N,N',N' tetrakis(2-hydroxypropyl)-1,3-diamino-2-propanol, N,N,N',N' tetrakis-(2-hydroxybutyl)ethylene diamine and N,N,N',N'',N''', N''' hexakis(2-hydroxypropyl)triethylene tetraamine are prepared as in Part A except for the substitution of the totally hydroxyalkylated alkylene diamine of interest for the N,N,N',N' tetrakis(2-hydroxypropyl)ethylene diamine of Part A.

The tri- and tetra- fatty acid esters can be prepared by the techniques of Examples 1 and 2 by simply increasing the mol ratio of fatty acid to totally hydroxyalkylated alkylene polyamine.

EXAMPLES 3–8

Additional esters of N,N,N',N' tetrakis(2-hydroxypropyl)ethylene diamine are prepared by esterification with lauric acid, oleic acid and tall oil (a mixture of fatty acids and rosin acids). The esters prepared are set forth in Table I.

TABLE I

| Example No.: | Ester prepared |
|---|---|
| 3 | Monooleate. |
| 4 | Dioleate. |
| 5 | Monolaurate. |
| 6 | Dilaurate. |
| 7 | Mono tall oil ester. |
| 8 | Di tall oil ester. |

The specific esters set forth in the above examples are merely illustrative of the invention and analogous products can be prepared by esterifying fatty acids and/or rosin acids containing at least 8 carbon atoms with other totally hydroxyalkylated alkylene polyamines such as N,N,N',N' tetrakis(1 - methyl - 2 - hydroxypropyl)1,3-diamino-2-propanol, N,N,N',N' tetrakis(2-hydroxybutyl) 1,3-diamino-2-propanol, N,N,N',N' tetrakis(2-hydroxypropyl)hexamethylene diamine, N,N,N',N' tetrakis(2-hydroxybutyl)propylene diamine, N,N,N',N' tetrakis(1-methyl-2-hydroxypropyl)ethylene diamine, N,N,N',N'', N'' pentakis(2-hydroxypropyl)diethylene triamine and N,N,N',N'',N''',N''' hexakis(2-hydroxybutyl)triethylene tetraamine.

EXAMPLE 9

Part A

A quaternary ammonium salt of the monolaurate ester of N,N,N',N' tetrakis(2-hydroxypropyl)ethylene diamine of Example 5 is prepared by refluxing 148 grams of the monolaurate ester with 100 grams of ethylene chlorohydrin for 3.3 hours. The excess ethylene chlorohydrin is removed by vacuum distillation. The quaternary ammonium salt produces copious foam in aqueous solutions.

Part B

A quaternary ammonium salt of the dilaurate ester of N,N,N',N' tetrakis(2-hydroxypropyl)ethylene diamine is prepared in a manner completely analogous to that described in Part A above except that the dilaurate ester of Example 6 is used in lieu of the monolaurate ester of Part A. The salt foams well in aqueous solutions.

EXAMPLE 10

The monolaurate ester of N,N,N',N' tetrakis(2-hydroxypropyl)ethylene diamine of Example 5 is added in the amount of 98 grams to 46 grams of sodium chloracetate that is dissolved in a solvent consisting of 50 grams of water and 40 grams of ethyl alcohol. The reaction is stirred and heated at reflux temperature of approximately 90° C. for a period of 12.4 hours. The product is soluble in water and has a good foaming action.

EXAMPLE 11

A quaternary ammonium salt of the monolaurate ester of N,N,N',N' tetrakis(2-hydroxypropyl)ethylene diamine of Example 5 is prepared by adding 98 grams of the monolaurate ester and 51 grams of benzyl chloride to 100 grams of toluene and refluxing the mixture for 8 hours. The toluene is removed from the product by vacuum stripping.

EXAMPLE 12

A quaternary ammonium salt is prepared by mixing 185 grams of the monooleate ester of N,N,N',N' tetrakis(2-hydroxypropyl)ethylene diamine of Example 3 with 47 grams of benzyl chloride and heating the mixture under reflux at 100–130° C. for 5 hours.

EXAMPLE 13

A quaternary ammonium salt is prepared by reacting 170 grams of the mono- tall oil ester of N,N,N',N' tetrakis(2-hydroxypropyl)ethylene diamine of Example 7 with 42.5 grams of benzyl chloride as described in Example 12.

EXAMPLE 14

A quaternary ammonium salt is prepared by mixing 222 grams of the monooleate ester of N,N,N',N' tetrakis-(2-hydroxypropyl)ethylene diamine of Example 3 with 51 grams of dimethylsulfate and heating the mixture at 100° C. for 3 hours.

EXAMPLE 15

Part A

A quaternary ammonium salt is prepared by reacting the mono- tall oil ester of N,N,N'N' tetrakis(2-hydroxypropyl)ethylene diamine of Example 7 with dimethylsulfate as described in Example 14.

Part B

Additional quaternary ammonium salts are prepared by reacting the monostearate esters of N,N,N',N' tetrakis(2-hydroxypropyl)1,3-diamino-2-propanol, N,N,N',N' tetrakis(2-hydroxybutyl)ethylene diamine and N,N,N',N'',N''',N'''' hexakis(2-hydroxypropyl)triethylene tetraamine with dimethylsulfate following the procedure of Example 14.

EXAMPLE 16

To 42 grams of ethanol are added 104 grams of the monooleate ester of N,N,N',N' tetrakis(2-hydroxypropyl) ethylene diamine of Example 3 and 30 grams of methyl iodide. The mixture is permitted to stand for 48 hours and then refluxed at 75–100° C. for 15 hours. The volatile components are removed by vacuum stripping and 133.5 grams of the product are obtained.

EXAMPLE 17

A stable kerosene in water emulsion is formed, employing the quaternary ammonium salt of Example 16 as the emulsifier, by adding 8 grams of the quaternary ammonium salt and 32 grams of kerosene to a glass stoppered graduate and adding 160 grams of water thereto in small increments with vigorous shaking. The emulsion so obtained was stable.

Additional stable kerosene and/or xylene emulsions are prepared in the same manner with the quaternary ammonium salts of Example 9, Part B and Example 15. Similarly, a stable xylene in water emulsion is prepared from the hydrochloride salt of the monooleate ester of N,N,N',N' tetrakis(2-hydroxypropyl)ethylene diamine of Example 3, which salt is a quaternary ammonium salt in its simplest form. In each case the emulsion was stable.

What is claimed is:

1. A surface active agent consisting of the quaternary ammonium salt reaction product of an alkylating agent selected from the group consisting of lower alkyl halides, lower alkyl sulfates, lower alkylene chlorohydrins, sodium chloroacetate and benzylchloride and a tertiary aminoester having the formula

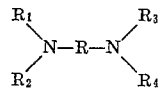

wherein $R_1$, $R_2$, $R_3$ and $R_4$ are monovalent radicals selected from the group consisting of radicals having the formulae —$CH_2CH(OH)CH_3$; —$CH_2CH(OOCR_5)CH_3$; —$CH_2CH(OH)CH_2CH_3$; —$CH_2CH(OOCR_5)CH_2CH_3$;

—$CH(CH_3)CH(OH)CH_3$ and

—$CH(CH_3)CH(OOCR_5)CH_3$ wherein said radical formulae $R_5$ is selected from the group consisting of aliphatic hydrocarbon radicals having from 8 to 20 carbon atoms and abietyl radical, at least 1 and not more than 2 of said $R_1$, $R_2$, $R_3$ and $R_4$ radicals containing an $R_5$ radical in its structure; and wherein R is a divalent radical selected from the group consisting of alkylene radicals having 2 to 6 carbon atoms, 2-hydroxy-1,3-propylene, and radicals represented by the formula

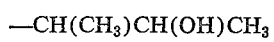

wherein $n$ is an integer not higher than 2, $R_6$ is a divalent radical selected from the group consisting of ethylene and propylene and $R_1$ is a monovalent radical as hereinbefore defined.

2. A surface active agent according to claim 1 wherein in the amino-ester R is ethylene, three of $R_1$, $R_2$, $R_3$ and $R_4$ are —$CH_2CH(OH)CH_3$ and one of $R_1$, $R_2$, $R_3$ and $R_4$ is —$CH_2CH(OOCR_5)CH_3$, and $R_5$ is an aliphatic hydrocarbon radical having from 8 to 20 carbon atoms.

3. A surface active agent according to claim 1 wherein in the amino-ester R is ethylene, two of $R_1$, $R_2$, $R_3$ and $R_4$ are —$CH_2CH(OH)CH_3$ and two of $R_1$, $R_2$, $R_3$ and $R_4$ are —$CH_2CH(OOCR_5)CH_3$ and $R_5$ is an aliphatic hydrocarbon radical having from 8 to 20 carbon atoms.

4. A surface active agent according to claim 2 wherein —$OOCR_5$ is an oleate radical.

5. A surface active agent according to claim 2 wherein —$OOCR_5$ is a stearate radical.

6. A quaternary product obtained by heating a quaternizing agent with a polyester mixture obtained by heating about 2 mols of a fatty acid of the formula $R_1$—COOH, wherein $R_1$ is an aliphatic hydrocarbon radical having from 7 to about 19 carbon atoms, with one mole of N,N,N',N' tetrakis(2-hydroxypropyl)ethylene diamine, said quaternizing agent being selected from the group consisting of lower alkyl halides, lower alkyl sulfates, lower alkylene chylorohydrins and benzyl chloride.

References Cited in the file of this patent

UNITED STATES PATENTS

| | | |
|---|---|---|
| 2,248,729 | Ulrich et al. | July 8, 1941 |
| 2,262,738 | De Groote | Nov. 11, 1941 |
| 2,366,498 | De Groote | Jan. 2, 1945 |
| 2,382,612 | De Groote | Aug. 14, 1945 |
| 2,540,678 | Kelley | Feb. 6, 1951 |
| 2,697,118 | Lundsted et al. | Dec. 14, 1954 |